William W. Henderson, Inventor

UNITED STATES PATENT OFFICE.

WILLIAM W. HENDERSON, OF WASHINGTON, DISTRICT OF COLUMBIA, ASSIGNOR OF ONE-HALF TO HUGH A. THRIFT AND WILLIAM HINDS, OF WASHINGTON, DISTRICT OF COLUMBIA.

FLUID-CLUTCH.

No. 879,045.    Specification of Letters Patent.    Patented Feb. 11, 1908.

Application filed June 11, 1907. Serial No. 378,415.

*To all whom it may concern:*

Be it known that I, WILLIAM W. HENDERSON, a citizen of the United States, residing at Washington, District of Columbia, have invented certain new and useful Improvements in Fluid-Clutches, of which the following is a specification.

This invention is a fluid clutch, of that class having two rotatable elements with a chamber between containing fluid, which is driven around in passages by the driving element, with valves in the passages to obstruct the flow of the liquid to a greater or less extent and thereby act to couple the parts and transmit the motion.

The object of the invention is to produce a strong, simple and improved device of the kind, characterized particularly by rolling pistons or elements to produce the circulation of the liquid when said valves are open, and to transmit the power when said valves are closed.

A further feature of the invention is an improved positive clutch, becoming operative after the parts are fully coupled, and serving to then take the strain off the parts of the liquid clutch.

The invention is illustrated in the accompanying drawings, in which—

Figure 1:
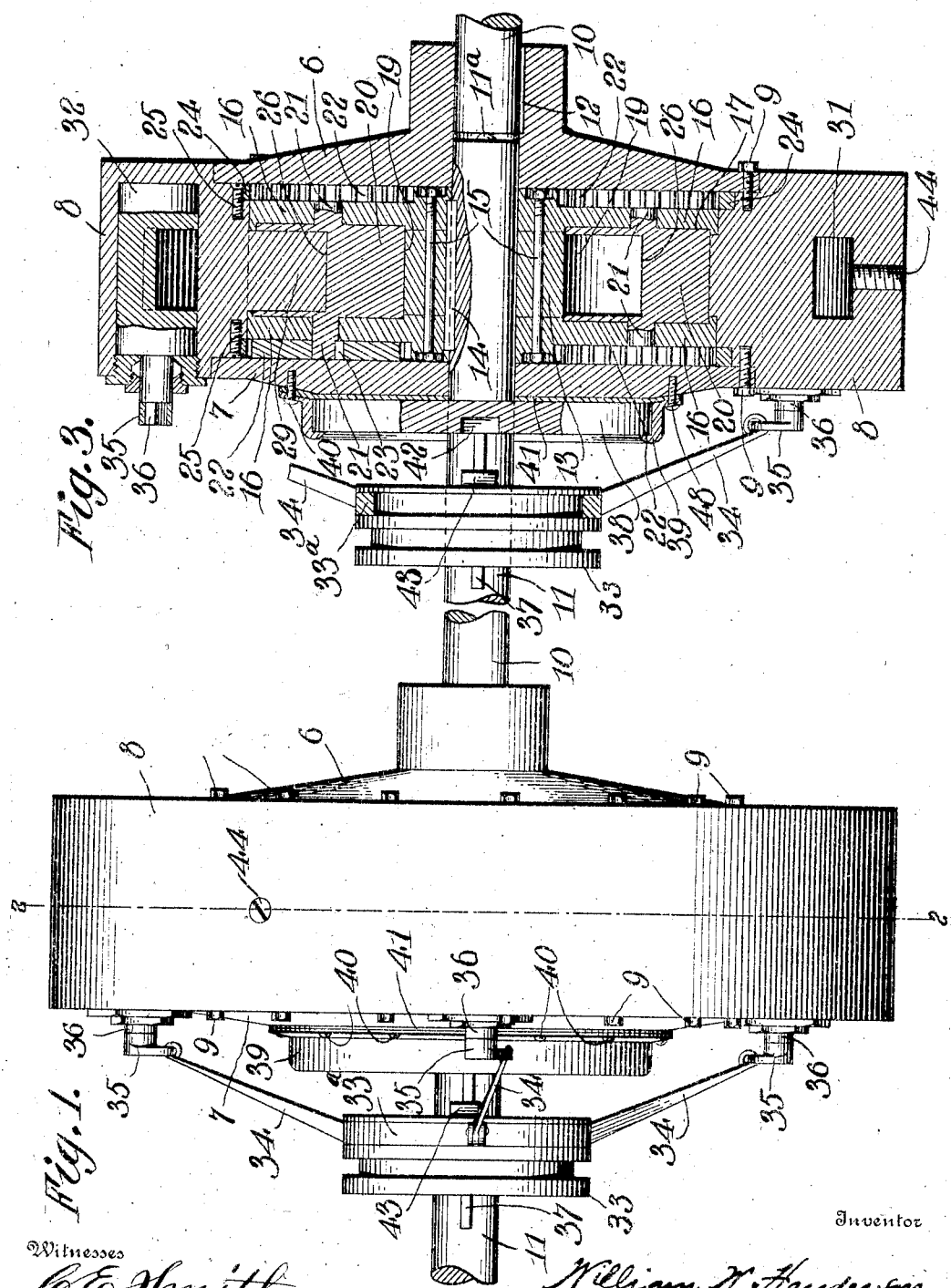
Figure 2:
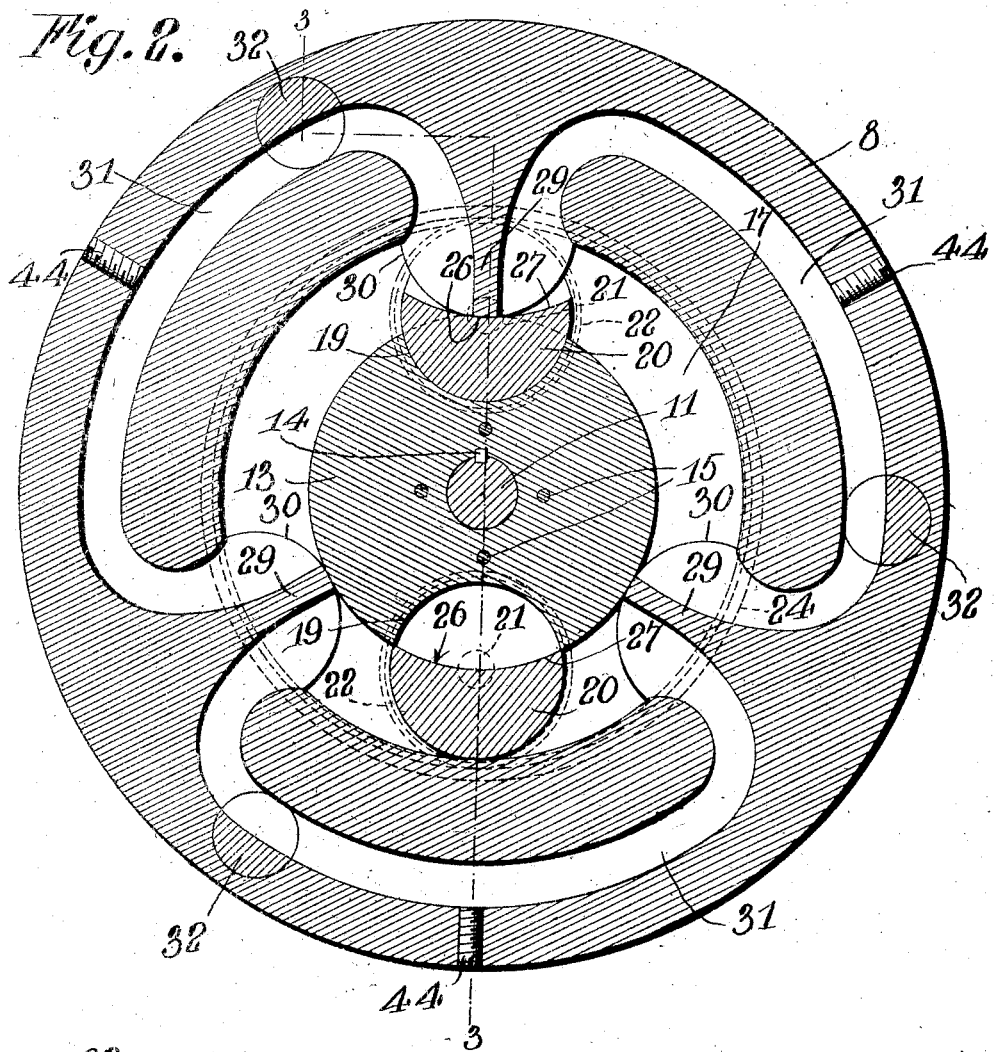
Figure 4:
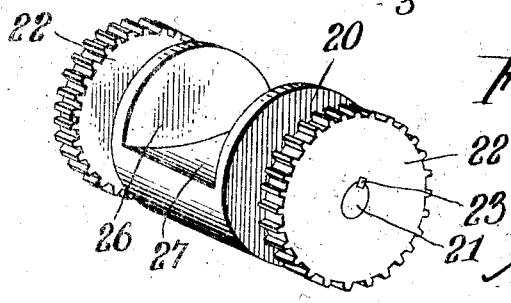

Figure 1 is a side elevation of the clutch. Fig. 2 is a section on the line 2—2 of Fig. 1. Fig. 3 is a section on the line 3—3 of Fig. 2. Fig. 4 is a detail in perspective of one of the pistons.

The outer casing of the clutch is formed of two disks or circular plates indicated at 6 and 7, and a spacing rim 8 fixed therebetween by bolts 9. This rim is weighted, or heavy, and acts as a fly wheel. The shaft sections are coaxial, and are indicated at 10 and 11, and for the purpose of convenience the former will hereafter be referred to as the driving shaft and the latter as the driven shaft, although this may be reversed. The said casing is fast upon the driving shaft by a key 12. The driven shaft projects at its end within the casing referred to, and preferably abuts the driving shaft, as indicated at 11ª, to sustain any end thrust.

The driven shaft carries a hub 13, fitting between the side plates of the casing, and fast thereon by a key 14. For convenience of assemblage the hub is preferably built up of three pieces fastened together by countersunk bolts 15.

The hub so formed has annular peripheral flanges as indicated at 16 to produce an annular chamber 17 extending around within the rim 8 of the casing, and the body of the hub is further provided with a pair of opposite segmental recesses 19 which contain the rolling or rotatable pistons 20 which fit in said recesses and in the chamber referred to. These pistons have trunnions 21 at opposite ends, which find bearings in the flanges 16 and which carry spur gears 22 on the ends thereof. These gears are made fast to the trunnions by keys 23 and are fitted in circular depressions or seats formed in the outer side of the flanges of the hub.

The gears 22 mesh with internal ring gears 24 set in rabbets in the opposite sides of the rim 8, and within the side plates 6 and 7. These ring gears are fixed to the rim by screws 25. There are two pistons, as shown, at diametrically opposite points, and each piston carries a pair of gears, and these gears sustain the drive when the parts are coupled, although, as hereinafter described, I provide a positive clutch which may be made effective after the said parts are fully clutched, and which then takes the strain off the gears and the other parts of the fluid clutch.

Each of the pistons 20 has the form of a cylindrical block, with the trunnions 21 at the ends, as heretofore referred to, and the body of this block is cut away as indicated at 26, leaving a solid portion which is segmental or crescentic in cross section, the inner surface 27 coinciding in its plane or degree of curvature with the circumference of the hub 13, as clearly appears in Fig. 2, and the diameter of the piston is such that its outer surface is in easy or rolling contact with the inner surface 28 of the rim 8. Said rim has a series of abutments 29 on the inner side thereof, said abutments being set on thirds so that at least one of the two pistons will always be in active position. The abutments project to bearing contact with the hub 13, that is, across the chamber 17, and divide said chamber into three parts, and said abutments are also formed with an arcuate surface 30, in said chamber, the arc being that of a curve or cycloid described by a point on the surface 27 as the piston rolls along the surface 28, so that said surface 27 is in contact with the abutment at some point during the whole of its turn thereover.

The three chambers 17 produced by the abutments above described are connected at opposite ends by passages 31, cored in the rim 8. The cross sectional area of these passages equals that of the chambers 17, so that free flow is possible. The flow of liquid through these passages is controlled by oscillating valves 32, the sectional area of whose ports is equal to the similar area of the passages. These valves are incased in the rim and the stems thereof project through the side. The valves may be turned to open or close the passages to a greater or lesser extent, and consequently control the circulation of the liquid.

Any suitable means for operating the valve may be used. I have shown a shifting sleeve 33 having a circular groove with a collar 33ª therein connected by rods 34 to crank arms 35 on the valve stems 36. The sleeve may be shifted along the shaft by an ordinary yoke or lever, or by any other convenient device, and when so shifted will turn the valves accordingly, and a quarter turn will completely close the valves. The sleeve 33 is keyed on the shaft 11, as indicated at 37, and the collar is free to turn on the sleeve, and the arrangement is such that the valves 32 are closed when the sleeve is thrust toward the clutch casing. This is for the purpose of allowing a positive clutch between the sleeve and the casing, now to be described.

The plate 7 of the casing has applied thereto a collar or disk 38 which extends around the shaft. This disk is fastened to the plate 7 by means of a ring clamp 39 and screws 40, with a disk 41 of leather or similar material placed between the collar and the casing. The collar 38 has a notch 42, and the sleeve 33 has a lug 43 which will enter said notch when the sleeve is shifted to the full extent.

The arrangement and construction are such that the valves 32 will be fully closed before the lug 43 reaches the notch 42, and accordingly the shifting lever or device may be stopped at that point, thus allowing the fluid clutch to operate the drive, but by throwing the lever to the last notch and shifting the collar to the full extent the lug 43 will enter the notch 42 and so complete the positive clutch. Whenever quick variations of speed are needed, the parts can be run under the liquid clutch alone, but for full continuous speed the positive clutch may be thrown in to lock the driving and driven elements together. Obviously several of the lugs 43 and notches 42 may be provided if necessary.

Inasmuch as the sleeve 33 is keyed on the shaft 11 and the collar 38 is fastened to the clutch casing, the casing and shaft will be coupled whenever the lug 43 enters the notch. Thereby the driving strain will be taken from the interior parts of the clutch and will be transmitted directly from the shaft 10 through the casing and thence to the sleeve 33, and the driven shaft 11. In order, however, to provide for any accidental stoppage of the machinery, and to render the clutch less absolute, the disk 38 will, under excessive strain, turn, with respect to the casing, the amount of pressure required to produce such action being dependent upon the degree to which the ring clamp and the screws 40 are tightened. And it may be remarked in this connection, that such excessive force will also, it is considered, be sufficient to force the liquid in the chambers through the joints between the abutments and the hub and pistons, thereby allowing the liquid clutch to yield somewhat, under such conditions, although, of course, it is intended that under ordinary conditions either or both clutches will hold. But it will be seen that, for example, in starting, the sleeve 33 being shifted toward the casing gradually closes the valves 32 which starts the operation of the clutch, until finally the full speed is reached, after which the lug 43 may be made to enter the notch 42 and form a positive or mental clutch which will relieve all strain on the liquid and the gears in the casing.

The chambers and passages within the casing will be substantially filled with oil or similar liquid, through holes closed by screw plugs 44. Preferably a slight space will be left unfilled, to allow room for the change of capacity incident to the entry of the pistons into the chambers. Such change, however, will be slight, inasmuch as after passing a certain point on the abutments the fluid will flow into the recessed portion of the pistons sufficiently to equalize the capacity.

In operation, the clutch casing rotates with the shaft section 10, and, the valves 32 being open, the ring gears 24 acting upon the spur gears 22 cause the pistons 20 to travel or roll around in the chambers 17 and by their movement force the fluid around through the passages 31, without movement of the driven parts. By closing the valves more or less the passage of the fluid will be obstructed to a greater or less extent and consequently the motion or variable speed will be transmitted to the hub 13 and shaft 11 in proportion to the extent of the closure of the valves, and when the valves are closed the clutch is complete, and the positive or outside clutch may thereafter be put into operation. Of course the latter clutch may be omitted if desired.

Various other changes and modifications may be made within the scope of the invention. Especially the device is capable of use as a brake, by fixing one of the parts and operating the valves to bring the other part to a stop.

I claim:

1. In a fluid clutch, the combination of a driving member, a driven member, a casing upon one of said members, having therein a fluid chamber and a passage in the casing connecting opposite ends of said chamber, a rolling piston carried upon the other member, and adapted to travel in said chamber and force fluid through said passage when it is open, and a valve in said passage.

2. In a fluid clutch, the combination of a driving member, a driven member, a casing upon one of said members, having fluid chambers extending around within the same and abutments separating said chambers, rolling pistons adapted to travel in said chambers and connected to the other member, means to cause the pistons to pass the abutments, and valve-controlled passages connecting opposite ends of the chambers.

3. In a fluid clutch, the combination of a driving member, a driven member, a casing connected to one member and having fluid chambers therein and valved passages in the casing connecting opposite ends of said chambers, and pistons operatively connected to the other member and arranged to travel in said chambers and force the fluid through said passages when the valves are open.

4. In a fluid clutch, the combination of a driving member, a driven member, a casing connected to one member and having a series of fluid chambers extending around the other member and valved passages in the casing connecting opposite ends of said chambers, and pistons adapted to travel in said chambers and force the fluid through said passages when the valves are open, the number of chambers being unequal to the number of pistons.

5. The combination with a variable speed fluid clutch, and means for the gradual operation thereof, said clutch having a casing inclosing the fluid, of a positive clutch exterior to and coöperating with said casing, and operated by said means after the fluid clutch is fully engaged.

6. The combination of a shaft, a fluid-clutch thereon, with a casing having a notched plate clamped to the side thereof, a shifting sleeve on the shaft, having a projection engageable in said notch, and means actuated by the sleeve to operate the fluid clutch.

7. The combination of shaft sections having a fluid clutch casing therebetween, with controlling valves in the casing, a notched plate clamped to the side of the casing, a shifting sleeve keyed on one shaft section and having an operative connection to the valves and also having a projection engageable in the notch.

8. In a fluid clutch, the combination of a shaft section having a casing fixed thereon, the casing having a series of fluid chambers and abutments separating the same, and ring gears extending around in said casing, another shaft section extending into said casing and having a hub therein, rolling pistons carried by the hub and working in said chambers and having gears engaging said ring gears, the pistons being shaped to pass the abutments, and means to obstruct flow of the fluid in said chambers.

9. In a fluid clutch, the combination of a shaft section, a casing fixed thereon, and having a series of segmental chambers therein and valved passages connecting opposite ends of each chamber, abutments between the chambers, having curved inner surfaces, another shaft section having a hub fixed thereon within the said casing and contacting with said abutments, rolling pistons carried by the hub and arranged to travel in said chambers, said pistons being recessed on one side with an arcuate surface to pass said abutment in contact therewith, and gearing between the casing and said pistons, to cause the rotation of the latter.

In testimony whereof I affix my signature, in presence of two witnesses.

WILLIAM W. HENDERSON.

Witnesses:
M. R. KUNSMAN,
GEO. E. TEW.